United States Patent [19]

Giesen

[11] Patent Number: 5,459,167

[45] Date of Patent: Oct. 17, 1995

[54] PROCESS FOR PRODUCING A FORMED SILICONE FOAM BY INJECTION MOLDING

[75] Inventor: Franz J. Giesen, Cologne, Germany

[73] Assignee: H. B. Fuller Licensing & Financing, Inc., Arden Hills, Minn.

[21] Appl. No.: 142,532

[22] Filed: Oct. 25, 1993

[30] Foreign Application Priority Data

Oct. 22, 1992 [DE] Germany .......................... 42 35 638.5

[51] Int. Cl.$^6$ ....................................................... B29B 7/00
[52] U.S. Cl. ........................... 521/79; 264/45.3; 264/53; 264/328.6; 521/91; 521/110; 521/122; 521/154
[58] Field of Search .................... 264/45.3, 53, 328.6; 521/79, 91, 110, 122, 154

[56] References Cited

U.S. PATENT DOCUMENTS

| 4,888,217 | 12/1989 | Jones | ....................... 521/154 |
|---|---|---|---|
| 5,356,940 | 10/1994 | Giesen | ....................... 521/154 |

FOREIGN PATENT DOCUMENTS

416229A2  11/1991  European Pat. Off. .

Primary Examiner—Morton Foelak
Attorney, Agent, or Firm—Vidas, Arrett & Steinkraus

[57] ABSTRACT

To manufacture high quality, fine pored silicone foam parts by the injection molding process, two reaction components A and B are used. They both contain a silicone polymer and fumed silica. The component A also contains a complexed organo-platinum catalyst and a small portion of water, whereas the other component B contains as a crosslinker polydimethyl hydrogen siloxane.

At least one of the two components A and B of the mixture is pressurized with a gas, preferably air or nitrogen, in a pressure container so that the gas is dissolved into the component(s). The components A and B are mixed in the pressure process, injected into an injection mold, and heated so that the foaming process forms the silicone foam part.

12 Claims, 1 Drawing Sheet

PROCESS FOR PRODUCING A FORMED SILICONE FOAM BY INJECTION MOLDING

BACKGROUND OF THE INVENTION

The invention relates to a process for producing a formed silicone foam by foaming the two-component, foam reaction mixture in an injection mold.

Silicone elastomer molded parts have been produced by numerous injection molding processes, without hitherto achieving satisfactory product(s) with regard to the foam quality.

EP 0 416 229 A2 discloses a process for producing a fine pored, soft-elastic, sealing foam for lid, casing, and cavity seals, in which the reaction components of the foam are processed in a low pressure, two-component meter mixing machine and made to foam in a free rise process without the addition of heat. One reaction component contains a silicone polymer having at least two double bonds in the molecule, preferably vinyl groups, an organo-platinum catalyst, fumed silica (as a thixotrope), water (as blowing agent), and further additives, like reinforcers, thixotropes, adhesion promoters, preservatives, and color pigments. The other component is formed from hydrogen siloxane as the crosslinking agent. In the silicone foam described by the invention, the addition of water to the silicone component assures that during foaming, the hydrogen siloxane is essentially reacted, causing a high degree of hydrogen foaming., A post reaction, having detrimental effects on the quality of the silicone foam, is avoided. The increase in the blowing effect keeps the hydrogen siloxane concentration in the silicone-system relatively low.

SUMMARY OF THE INVENTION

The invention is based on silicone polymers, in which water is used as a blowing agent and hydrogen siloxane is used as a crosslinking agent. It is the objective of the invention to provide an economical and easily manageable process to produce high quality, fine pored silicone foam parts, which are free of physiologically harmful blowing agents, in a price competitive injection molding process.

According to the invention, this objective is accomplished by the following features of the process:

Production of Component A from
  a silicone polymer having at least two double bonds per molecule, preferably vinyl groups, a complexed organo-platinum catalyst, for example with butanol, fumed silica, water, and, if appropriate, further additives (alone or in combination) such as color pigments (e.g., carbon black, iron oxide red), foam regulators (e.g., fluorotensides), flame retardants, inexpensive fillers (e.g., quartz powder), etc.,
and Component B from
  a silicone polymer having at least two double bonds per molecule, preferably vinyl groups, fumed silica, and polydimethyl hydrogen siloxane (SiH crosslinking agent),
Pressurization of one of the two components, preferably both components A and B, with a gas in a pressure vessel to dissolve the gas in one or both components before mixing;
Mixing the two components A and B under compression; and
Injection of the reaction mixture into an injection mold under compression with heating of the reaction mixture within the injection mold.

DETAILED DESCRIPTION OF THE INVENTION

Figure 1:
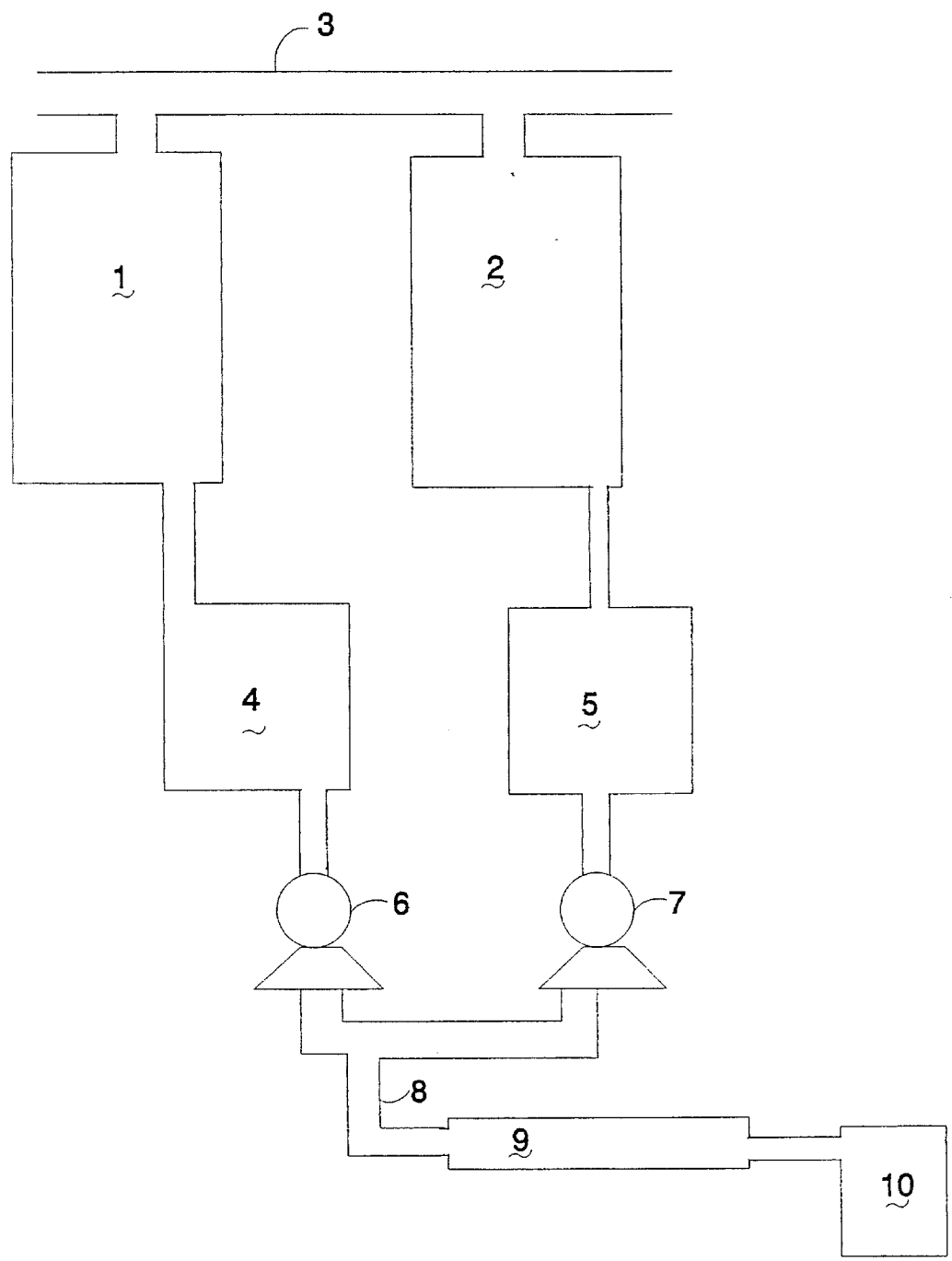
FIG. 1 is a schematic representation of an apparatus employed in the practice of the process of the invention.

In the process, according to the invention, components A and B are preferably used in the following compositions:
Component A:
  100 g of a silicone polymer having at least two double bonds per molecule, preferably vinyl groups,
  0.2–5 g of a complexed organo-platinum catalyst, for example with butanol,
  5–40 g of fumed silica,
  0.05–5 g of water, and further additives, if appropriate, alone or in combination.
Component B:
  100 g of a silicone polymer having at least two double bonds per molecule, preferably vinyl groups,
  5–40 g of fumed silica, and
  3–20 g of polydimethyl hydrogen siloxane (SiH crosslinking agent).

The above-mentioned components A and B are transferred into the injection mold at a mixing ratio of 1:1. At this mixing ratio, the pot life at 20° C. is a minimum of 3 days (limited by the butanol). The viscosity of the foam modified LSR-silicone material, therefore the foam reaction mixture, can be 5,000–2,000 mPa.s.

The process according to the invention makes use of both aforementioned components A and B, which both contain silicone polymer and fumed silica to improve the mechanical strength of the additives, the complexed organo-platinum catalyst and water as a blowing agent, while component B has hydrogen siloxane added. Before the mixing of the two components which form the foam reaction mixture, at least one of the components, preferably both, are contained in a pressure container under a pressurization gas such that the gas is thoroughly dispersed into the components in a dissolved form. The gas pressurization, in general, amounts to several hours and, if necessary, several days, and is dependent upon the pressurization gas used. This is followed by static mixing of both components while maintaining the pressure. The cold (approximately room temperature), mixture which is nonreactive due to the complexed organo-platinum catalyst, is injected into a mold such that the mold is only partly filled. Through heating of the decompressed mixture, a fine pored, homogenous, high quality silicone foam part is formed within a very short time, depending on the size of the molded part, within a very short time, depending on the size of the molded part, within seconds up to a few minutes. During the crosslinking reaction in the mold, the dissolved gas functions as a nucleating agent, which is responsible for the formation of a fine pored, silicone foam part. The small amount of hydrogen formed in the foaming process can be removed from the silicone foam part after removal from the mold and transfer to a closed storage container, or the like, by vacuum.

It is preferred that the gas used for pressurization of both component A and B, or only one component, be dry air or nitrogen, although other gases, such as the noble gases, can be used as well. The use of air or nitrogen is best for reasons of cost.

In general, the process according to the invention is run so that the gas pressurization of the referenced components, or at least one component, is done over a period of two hours (minimum) at a gas pressure of 70–700 psi. The foam reaction mixture is heated in the suitable injection mold to a temperature of approximately 170° C. to 220° C.

It is also essential in the process according to the invention that component A and B be free of air bubbles after the pressurization of the mixture and until the introduction into the injection mold. The inclusion of air bubbles disturbs the formation of a fine pored, homogenous silicone foam. It is recommended that the mixture of both components be processed in a closed atmosphere piping and/or mixing system.

The process, according to the invention, is schematically described below, in combination with the attached drawing.

The preparation unit shows two pressure containers, 1 and 2. One contains component A and the other component B. Both components are essentially free of air bubbles. The two pressure containers 1 and 2, are connected to a pressure pipe 3. The pressure gas, preferably dry air or nitrogen, is introduced under pressure into the pressure containers so that the components remain in a pressure container over a long time, preferably for at least 2 hours or more, under the pressurization gas 70–700 psi. The gas pressurized components pick up the gas in dissolved form.

The pressure containers 1 and 2 are connected with the intermediate containers 4 and 5, respectively, which take up the individual components retaining the dissolved gas. There is no pressure drop, and therefore, components A and B reside within the intermediate containers, components A and B are drawn by gear pumps 6 and 7, at a mixing ratio of preferably 1:1, through pipe 8 and under pressure into a screw extruder 9, where the components A and B are mixed, and the thusly formed foam reaction mixture is injected into the injection mold 10 times such that the injected mixture only partially fills the injection mold. The injected mixture is released into the injection mold 10 and is heated to a temperature of approximately 170°–220° C. Within a short time, a fine pored, high quality silicone foam part arises. After the unmolding of the silicone foam part, it can be transferred to a storage room or storage container, or the like. If possible, the released hydrogen can be removed by an exhaust system.

What is claimed is as follows:

1. A process for producing a formed silicone foam by foaming a mixture of a component A and a component B, wherein:

component A contains a silicone polymer having at least two double bonds per molecule, an organo-platinum catalyst, fumed silica, and water;

component B contains a polydimethyl hydrogen siloxane crosslinking agent, and additionally contains a silicone polymer having at least two double bonds per molecule, and fumed silica; and, the process includes the steps of:

pressurizing at least one of the two components A and B, before mixing with a gas in a pressure container to dissolve the gas into the component;

mixing the two components A and B while keeping the mixture pressurized; and injecting the reaction mixture into an injection mold under compression with heating of the reaction mixture within the injection mold.

2. The process as recited in claim 1, wherein the ingredients of the components A and B are present in the following relative amounts:

Component A:
   100 parts by weight of the silicone polymer having at least two double bonds per molecule,
   0.2–5 parts by weight of the organo-platinum catalyst,
   5–40 parts by weight of fumed silica,
   0.05–5 parts by weight of water, Component B:
   100 parts by weight of a silicone polymer having at least two double bonds per molecule,
   5–40 parts by weight of fumed silica, and
   3–20 parts by weight of a polydimethyl hydrogen siloxane crosslinking agent, and in which components A and B are mixed at a mixing ratio of 1:1.

3. The process as recited in claim 1 wherein air or nitrogen is used as the pressuring gas.

4. The process as recited in claim 1 wherein the components A and B are pressurized over a period of at least two hours with a gas pressure of 70–700 psi.

5. The process as recited in claim 1 wherein the foam reaction mixture is heated to a temperature of 170°–220° C. in an injection mold.

6. The process as recited in claim 1 wherein a fluorosilicone polymer is used as the silicone polymer for the two components A and B.

7. The process as recited in claim 1 wherein the components A and B are transferred from a pressure container to an intermediate container, and from there they are under mixing in a closed high pressure piping system.

8. The process as recited in claim 1 wherein the foam reaction mixture is injected by an extruder to partially fill an injection mold.

9. The process of claim 1 wherein the double bonds of at least one of the silicone polymers containing double bonds in components A and B are vinyl groups.

10. The process of claim 1 wherein the organo-platinium catalyst is complexed with butanol.

11. The process of claim 1 wherein component A further comprises at least one additive selected from the group consisting of color pigments, foam regulators, flame retardants, and fillers.

12. A process for producing formed silicone foam comprising:

mixing a two-part addition curable silicone composition comprising a component A comprising a silicone polymer having at least two double bonds per molecule, a platinium based catalyst and water, and a component B comprising a SiH containing crosslinker compound, pressurizing at least one of the two components A and B, before mixing, with a gas in a pressure container to dissolve the gas into the component;

mixing the two components A and B while keeping the mixture pressurized; and injecting the reaction mixture into an injection mold under compression with heating of the reaction mixture within the injection mold.

* * * * *